US005118088A

United States Patent [19]

Sawdon

[11] Patent Number: 5,118,088

[45] Date of Patent: Jun. 2, 1992

[54] POWER CLAMP

[75] Inventor: Edwin C. Sawdon, St. Clair, Mich.

[73] Assignee: BTM Corporation, Marysville, Mich.

[21] Appl. No.: 639,724

[22] Filed: Jan. 9, 1991

Related U.S. Application Data

[63] Continuation of Ser. No. 517,491, Apr. 30, 1990, abandoned, which is a continuation of Ser. No. 307,149, Feb. 3, 1989, abandoned, which is a continuation of Ser. No. 54,775, May 7, 1987, abandoned, which is a continuation of Ser. No. 763,016, Aug. 6, 1985, abandoned.

[51] Int. Cl.[5] .......... B23Q 3/08

[52] U.S. Cl. .......... 269/32; 269/27; 269/31; 269/78

[58] Field of Search .......... 269/25, 27, 30, 31, 269/32, 77, 78

[56] References Cited

U.S. PATENT DOCUMENTS 437,589 9/1890 Gibson .
1,667,616 4/1928 Wright et al. .......... 269/78
3,273,878 9/1966 Blatt .
3,371,923 3/1968 Blatt .
3,545,050 12/1970 Blatt et al. .......... 24/248
3,618,931 11/1971 Blatt .......... 269/94
3,702,185 11/1972 Blatt .......... 269/32
4,240,620 12/1980 Tunkers .......... 269/24
4,396,183 8/1983 Lymburner .......... 269/32
4,445,676 5/1984 Tunkers .......... 269/32
4,494,739 1/1985 Valentine .......... 269/32
4,496,138 1/1985 Blatt .......... 269/32

*Primary Examiner*—J. J. Hartman
*Attorney, Agent, or Firm*—Harness, Dickey & Pierce

[57] ABSTRACT

Several embodiments of a power clamp are disclosed which enable one arm or a pair of arms to be actuated for linear or rotational movement over a selected range of motion, depending on the manner in which the arm or arms are connected to the power clamp. Several embodiments, in addition to permitting actuation of various arms through various ranges of motion, further enable the arm or arms to be rotated about a transverse axis to a desired angular position, thereby further enhancing the adaptability of the power clamp device.

14 Claims, 8 Drawing Sheets

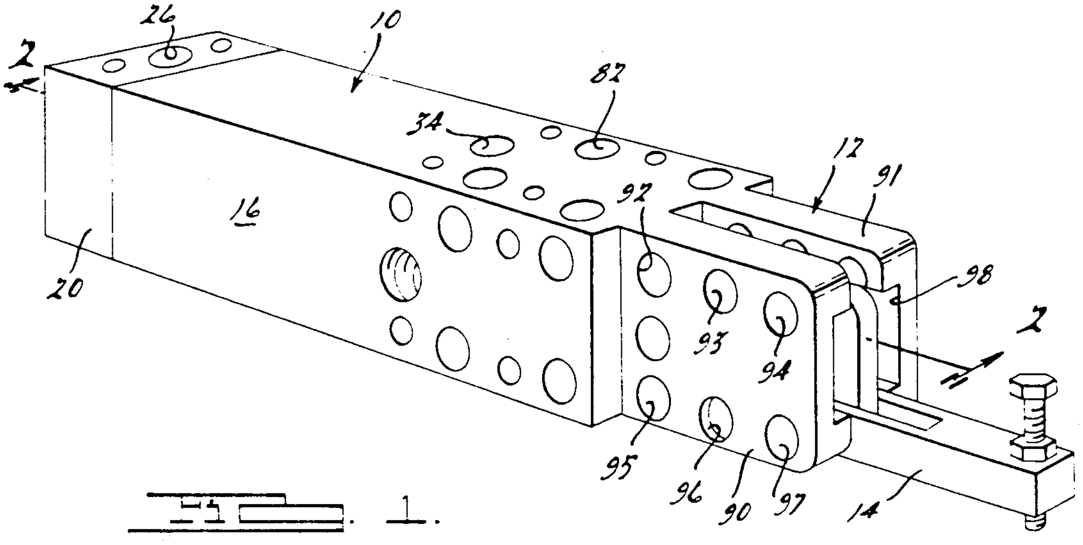
FIG. 1.
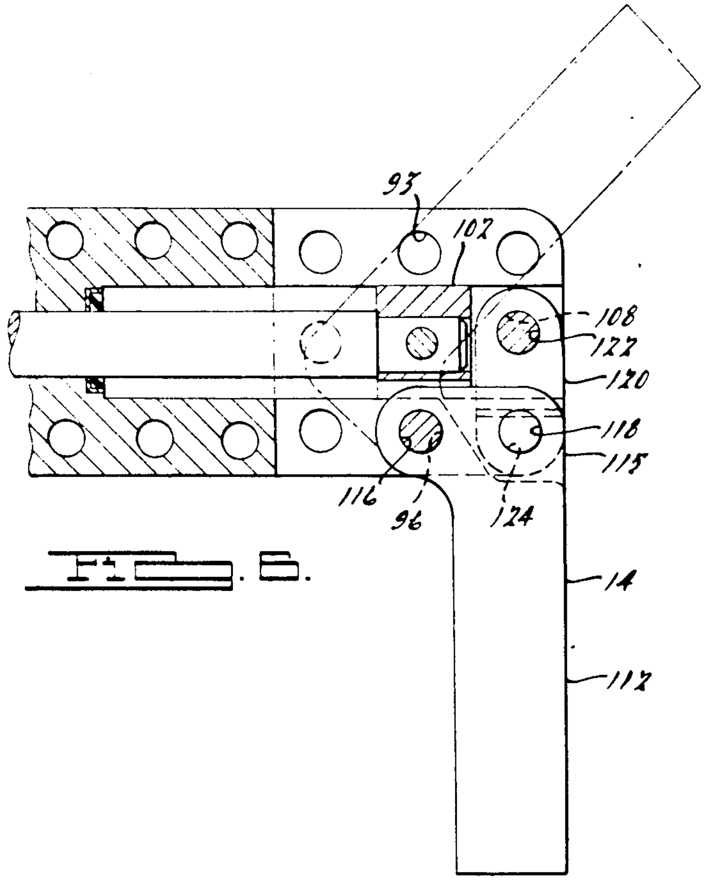
FIG. 6.
FIG. 4.
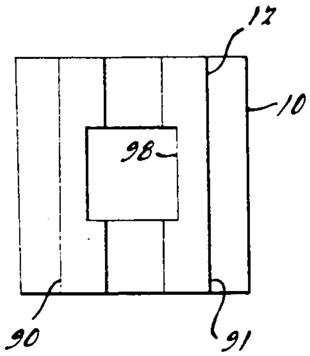

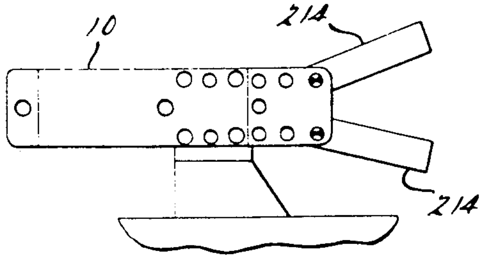
FIG. 10.
FIG. 12.
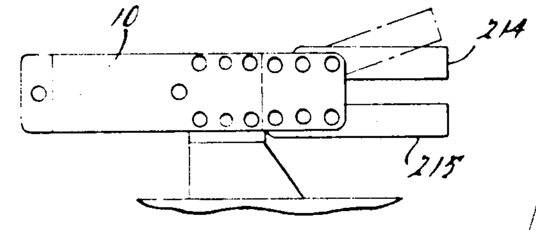
FIG. 14.
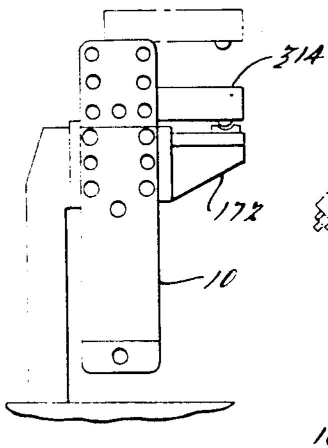
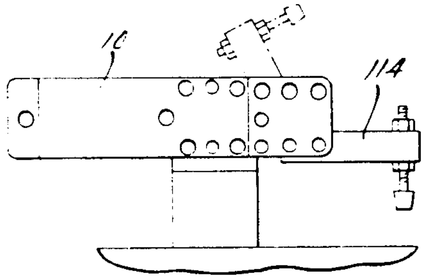
FIG. 8.
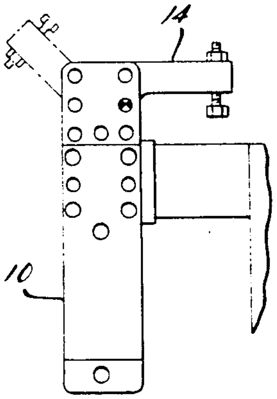
FIG. 5.
FIG. 13.
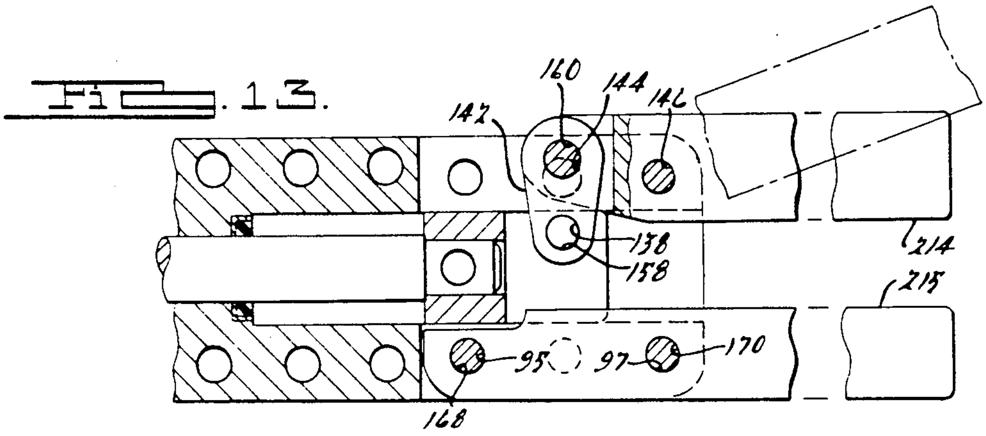

POWER CLAMP

This is a continuation of U.S. patent application Ser. No. 517,491, filed Apr. 30, 1990 which is a continuation of U.S. patent application Ser. No. 307,149, filed Feb. 3, 1989 which is a continuation of U.S. patent application Ser. No. 54,775, filed May 7, 1987 which is a continuation of U.S. patent application Ser. No. 763,016, filed Aug. 6, 1985, all now abandoned.

BACKGROUND AND SUMMARY OF THE INVENTION

This invention relates to clamping devices and particularly to fluid actuated power clamps ideally suited for holding workpieces in fixtures.

Power clamps are used in industrial applications for holding workpieces of many sizes and shapes during forming and machining operations. Such devices typically include a pneumatically or hydraulically actuated cylinder which causes one or more arms to move through a desired range of motion to push against a workpiece. Depending on the specific application, the user may wish to actuate one arm or two arms, in some cases along a linear path, and in other cases along a rotational path. Heretofore, it has been necessary for the power clamp user to order a specific configuration of power clamp device depending on the types of arms and the range and type of arm motion desired. This required the separate manufacture, stocking, handling, etc. of a variety of power clamp models.

In view of the above, it is an object of this invention to provide a power clamp suited for application, being capable of use to actuate a variety of configurations of arms and to move then over a variety of types of motion. A further object of this invention is to provide such a power clamp employing a minimum of components and one which is easily adapted by the user for various applications.

Additional benefits and advantages of the present invention will become apparent to those skilled in the art to which this invention relates from the subsequent description of the preferred embodiments and the appended claims, taken in conjunction with the accompanying drawings.

BRIEF DESCRIPTION OF THE DRAWINGS

FIG. 1 is a perspective view of a power clamp according to a first embodiment of this invention;

FIG. 4 is an end elevational view of the power clamp shown in FIG. 1 but with certain parts removed;

FIG. 5 is a pictorial view of a power clamp in accordance with a first embodiment of this invention showing one configuration of a swinging actuating arm and a manner of attaching the arm which provides a vertical clamping arrangement;

FIG. 6 is a partial longitudinal cross-sectional view taken in the center of the clamp shown in FIG. 5;

FIG. 8 is a pictorial view of a power clamp in accordance with a first embodiment of this invention showing another configuration of a swinging actuating arm and a manner of attaching the arm which provides a horizontal clamping arrangement;

FIG. 10 is a pictorial view of a power clamp in accordance with a first embodiment of this invention showing a pair of swinging arms and a manner of attaching the arms which provides a double arm clamping arrangement;

FIG. 12 is a pictorial view of a power clamp in accordance with a first embodiment of this invention showing a pair of arms and a manner of attaching the arms which provides a single swinging arm clamping arrangement;

FIG. 13 is a partial longitudinal cross-sectional view taken in the center of the clamp shown in FIG. 12;

FIG. 14 is a pictorial view of a power clamp according to a first embodiment of this invention showing a pair of arms and a manner of attaching the arms to the power clamp which provides a clamping arrangement utilizing linear movement of one arm;

DETAILED DESCRIPTION OF THE INVENTION

Figure 2:
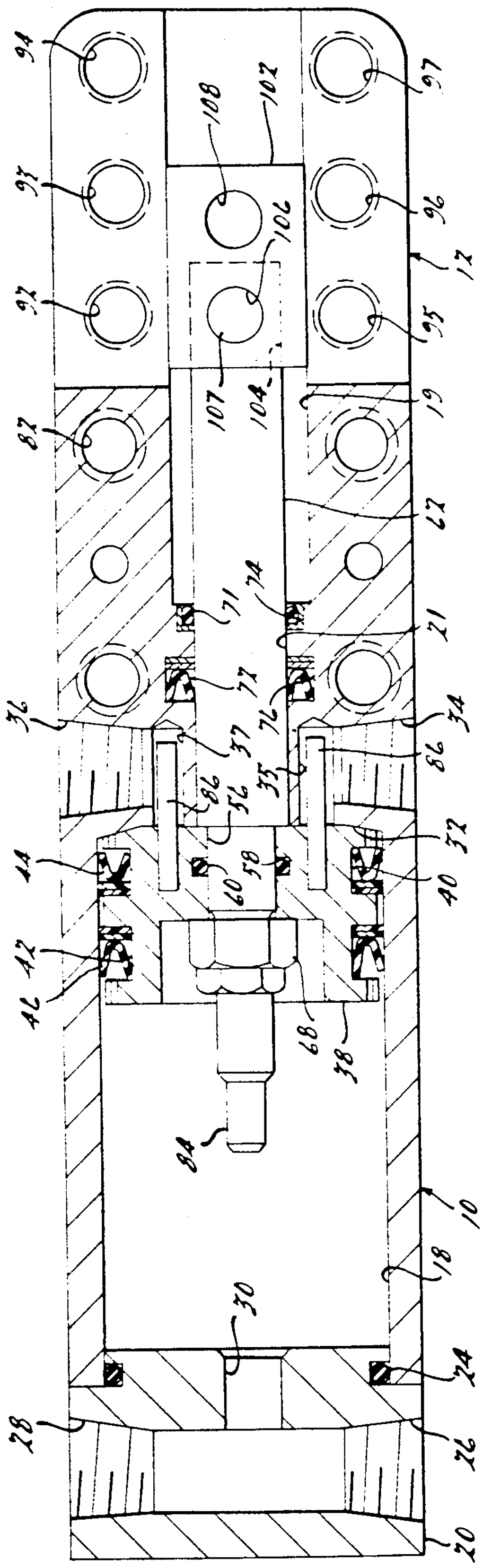
FIG. 2 is a longitudinal cross-sectional view of the power clamp shown in FIG. 1 taken generally along line 2—2 but with certain parts removed.
Figure 3:
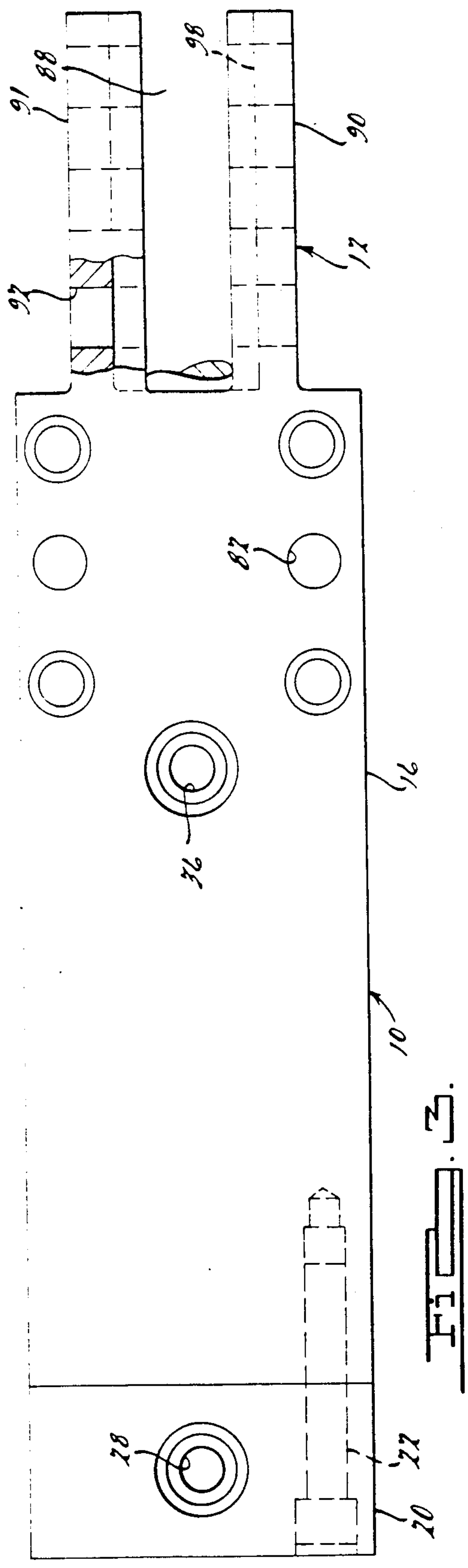
FIG. 3 is a plan view of the power clamp shown in FIG. 1 but with certain parts broken away.

A power clamp in accordance with a first embodiment of this invention is shown in the drawings, FIGS. 1 through 15, and generally comprises a body 10 having an actuating end 12 and one or more arms 14.

Body 10 is best shown in FIGS. 1 through 4 and comprises an elongated housing 16 having a circular cylindrical bore 18 at one end, a smaller square bore 19 at the opposite end, and an intermediate circular bore 21 of even a smaller diameter. One end of housing 16 and bore 18 is enclosed by end cap 20 secured by one or more cap screws 22. An end cap seal 24 maintains a fluid tight seal between end cap 20 and housing 16. End cap 20 has a pair of threaded ports 26 and 28 communicating with a central bore 30 which opens into bore 18. The opposite end of bore 18 is defined by a shoulder 32. Between bores 18 and 19 is a pair of transversely extending threaded ports 34 and 36 which communicate with bore 18 via axial bores 35 and 37, respectively. A piston 38 is slidably disposed within bore 18, and includes a pair of annular grooves 40 and 42 which retain seal assemblies 44 and 46, respectively, which contact the inside surface of bore 18 to inhibit fluid flow past piston 38. Piston 38 has a longitudinal bore 56 with an annular groove 58 having a seal element 60 disposed therein. A piston rod 62 is disposed within bore 56 and has a threaded end 66 (not shown). Rod nut 68 threadingly engages threaded end 66 to connect piston rod 62 to piston 38. The other end of piston rod 62 is slidably and sealingly disposed within bore 21 and extends axially into bore 19.

In accordance with well-known principles, when a fluid pressure differential exists between opposing axial ends of piston 38, it will be urged to move longitudinally. Such pressure differentials are caused in the normal way by directing fluid under pressure to ports 26 or 28 for piston movement in one direction, and ports 34 or 36 for piston movement in the opposite direction. A pair of seal assemblies 71 and 72 are disposed within grooves 74 and 76, respectively, in bore 21, which prevent fluid leakage along the surface of piston rod 62.

To provide an indication of the position of piston 38 within bore 18 (i.e. the status of the clamp) which may be used in connection with safety or automated machining systems, the power clamp includes provisions for employing electrical or fluid proximity sensors. One end of piston rod 62 has a reduced diameter end defining a probe 84. When piston 38 is moved to the left, probe 84 enters bore 30 and is positioned adjacent threaded bores 26 and 28. If a proximity sensor of known construction is installed within either of threaded ports 26 or 28 (i.e. the one not connected to a fluid source), a signal is provided indicating that piston 38 has reached its fully retracted position. Similarly, one or more axially extending probes 86 may be installed in the rod end of piston 38 to project into bores 35 and/or 37 in close proximity with threaded ports 34 and/or 36 when the piston is fully extended. A proximity sensor located in port 34 or 36 will therefore provide an indication or mechanically actuate a fluid valve when piston 38 reaches its fully extended position. When any of the ports 26, 28, 34, and 36 are not employed for connection to a source of fluid pressure or to mount a proximity sensor (which must close the port), a threaded cap or other appropriate fitting should be installed therein to prevent fluid escape.

The end of housing 16 opposite end cap 20 has a plurality of longitudinally and laterally spaced bores 82 which open on all four faces of housing 16 which facilitate convenient mounting of the power clamp to an associated structural member.

Actuating end 12 of the power clamp comprises a pair of longitudinally extending and spaced apart legs 90 and 91 which define a longitudinal slot 88 therebetween. Each of legs 90 and 91 has a number of mounting bores in the form of two longitudinally extending rows of holes along each edge. The top row (as shown in FIG. 2) comprises holes 92, 93 and 94 and the bottom row comprises holes 95, 96 and 97. The holes in leg 90 are transversely aligned with the holes in leg 91. A partially enclosed longitudinally extending center channel 98 is defined by the inside faces of legs 90 and 91 and constitutes an extension of square bore 19, as best shown in FIGS. 1, 2, and 4. A slide block 102 is slidingly disposed within channel 98 and has an internal bore 104 in which the end of piston rod 62 is disposed. The slide block has a pin bore 106 so that it can be connected to piston rod 62 by a pin 107. Slide block 102 has an additional bore 108 which facilitates attachment to an actuating arm 14, as will be described in more detail below. Each of holes 92-97 preferably includes a groove near the outer ends thereof to accommodate installation of a snap ring for retaining pins installed in the bores. Actuating end 12 and body section 10 are preferably manufactured as an integral unit from aluminum or aluminum alloys by an impact extrusion process which has been found to enable production of this component with a high level of dimensional precision and low dimensional tolerance variations.

The previously described configuration for a power clamp and particularly the design of slide block 102 and the unique arrangement of 92-97 enable the same basic power clamp design to be used with a variety of single and double arm configurations which may be actuated for linear or rotational motion and over various ranges of motion. Below are descriptions of some of these adaptations of the power clamp. This adaptability is achieved merely by using the proper slide block, link and arm components, and by inserting pins within the appropriate holes 92-97.

Figure 7:
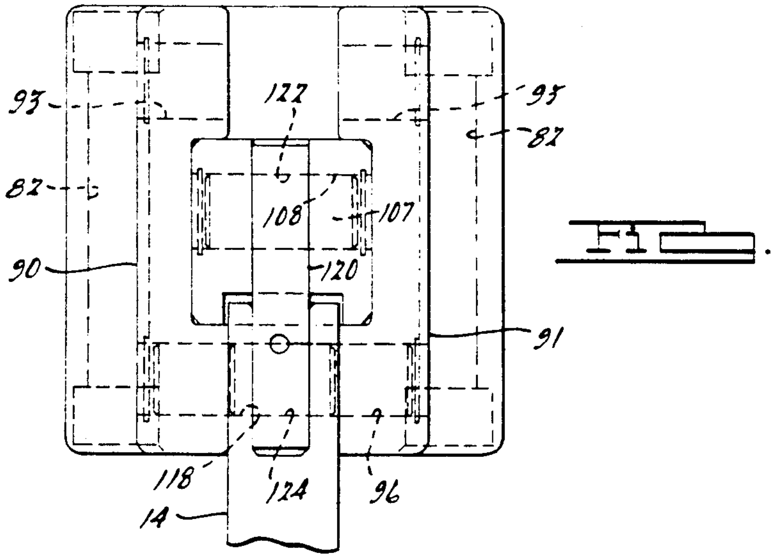
FIG. 7 is an end elevational view of the power clamp shown in FIG. 5.
Figure 16:
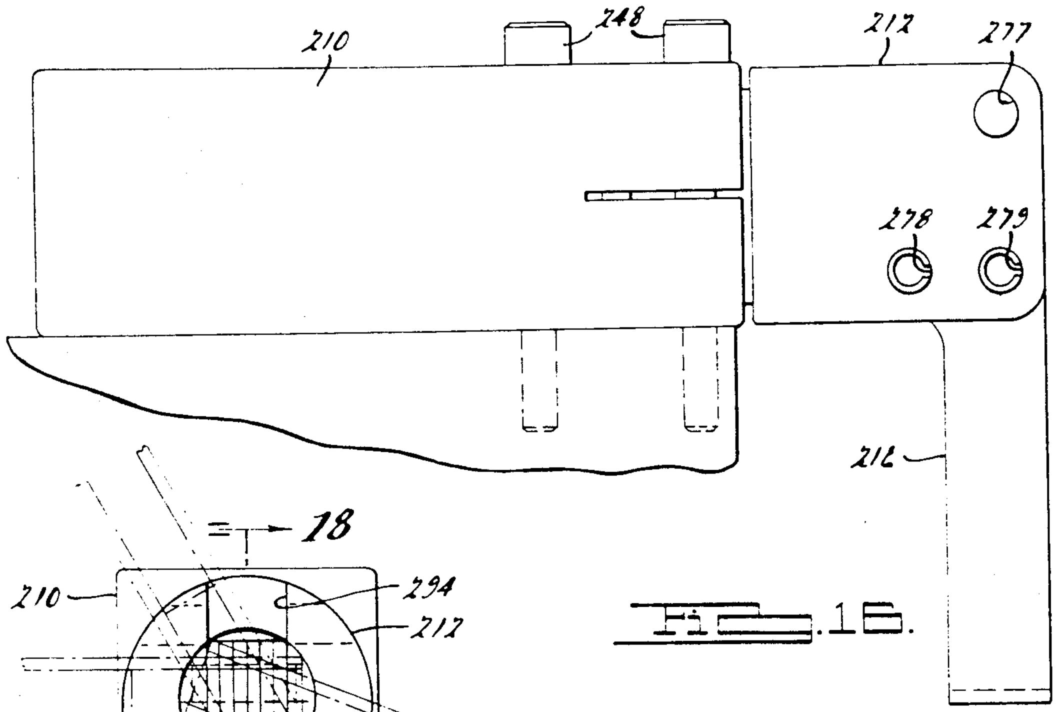
FIG. 16 is a side elevational view of a power clamp having a rotary head according to a second embodiment of this invention, shown with a single swinging actuating arm configuration providing a vertical clamping arrangement.

FIGS. 5, 6 and 7 illustrate an adaptation of the power clamp which provides a vertical clamping arrangement. For this application, arm 14 is used which has extended portion 112 and connecting end 115 which defines a pair of spaced apart bores 116 and 118. As shown in FIGS. 6 and 7, pin 107 is placed in either bore 93 or 96 (depending on the desired arm direction) of the power clamp actuating end 12 and in bore 116 to pivotably connect arm 14 to actuating end 12. A link 120 is provided having a pair of spaced apart bores 122 and 124, and another pin 107 is disposed in bores 118 and 124 thereby pivotably attaching link 120 to arm 14. Link 120 is also pinned for rotation to slide block 102 using another pin 107 disposed in bores 122 and 108. As piston 38 is extended and retracted, arm 14 rotates over a range of motion from the position indicated by solid lines to that shown in phantom lines in FIG. 6. Once slide block 102 is in the position shown in solid lines in FIG. 6, a high clamping force results due to the toggle or "nearcenter" arrangement of the components. This toggle feature enables the power clamp to remain in the clamped position without the continued application of fluid pressure.

Figure 9:
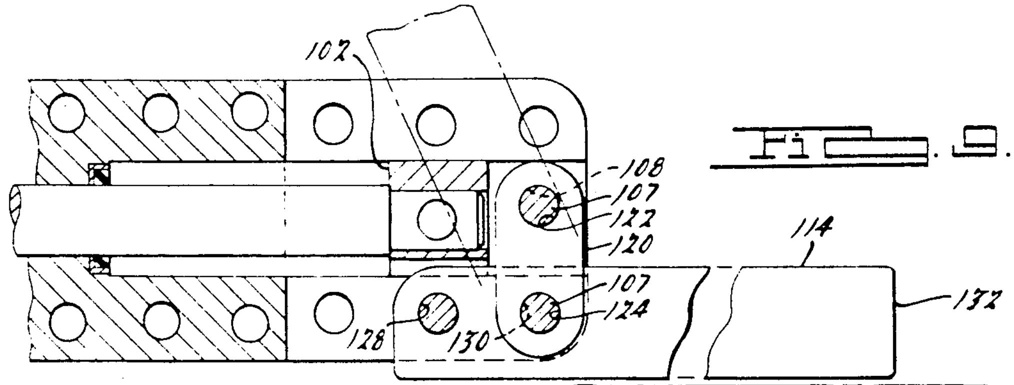
FIG. 9 is a partial longitudinal cross-sectional view taken in the center of the clamp shown in FIG. 8.

FIGS. 8 and 9 show another configuration for the power clamp wherein arm 114 is moved rotationally to provide a horizontal clamping arrangement. This configuration also employs link 120 having bores 122 and 124 which is pivotably attached to slide block 102 using a pin 107. Arm 114 is configured, however, so that the pair of bores 128 and 130 are oriented along the longitudinal axis of arm extending portion 132. Arm 114 is connected to actuating end 12 by pin 107 through either of holes 93 or 96 and bore 128. Link 120 is pivotably connected to slide block 102 by pin 107 through bores 108 and 122, and to arm 114 by pin 107 through bores 124 and 130. This arrangement provides a range of motion of arm 114 as shown in FIG. 9 from the solid line to the phantom line position. For this embodiment, high clamping force is achieved when arm 114 reaches the position shown in full lines due to the previously mentioned toggle effect.

Figure 11:
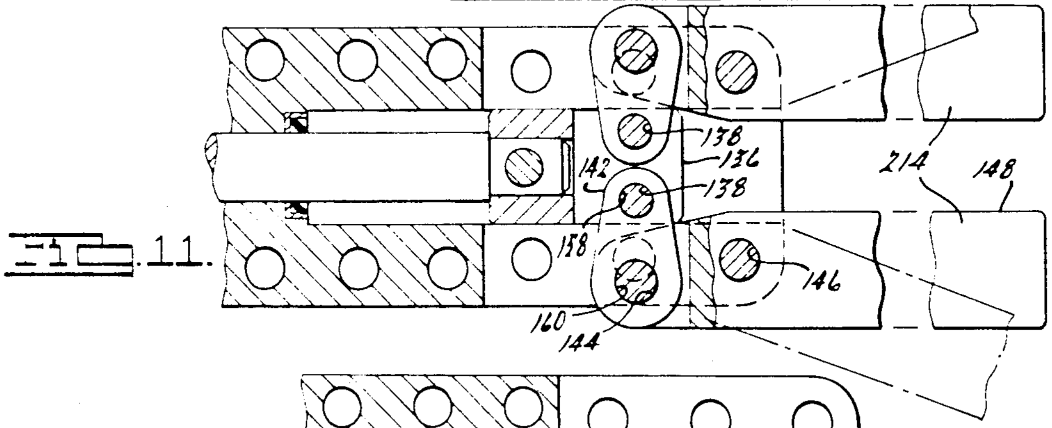
FIG. 11 is a partial longitudinal cross-sectional view taken in the center of the clamp shown in FIG. 10.

FIGS. 10 and 11 show another configuration for the power clamp which provides a double arm clamping configuration. For this application, slide block 136 is provided having a pair of laterally spaced bores 138. A pair of links 142 are used, each having bores 158 and 160. Arms 214 are generally similar to arm 114 in that they have a pair of bores 144 and 146 oriented in the direction of extending portion 148. Arms 214 are pinned for rotation to actuating end 12 through bores 94, 97 and 146. Links 142 are pivotably connected to slide block 136 and arm 214 by pins through bores 138 and 158, and 144 and 160 respectively. Movement of slide block 136 causes arms 214 to rotate providing a pinching motion as designated by the full and phantom line illustrated arm positions. For this application, high clamping forces are provided when arms 214 reach the closed position designated by full lines in FIG. 11 due to the toggle effect referred to previously.

FIGS. 12 and 13 illustrate another embodiment according to this invention which is generally similar to that depicted by FIGS. 10 and 11 except that only one movable arm 214 is provided. Arm 214 is affixed to the actuating end 12 in a manner identical to that of the arms 214 shown in FIGS. 10 and 11. Arm 215 is, however, rigidly connected to actuating end 14 by employing a pair of pins 107 installed through any two separated bores such as bores 92 and 94, or 95 and 97, and through a pair of bores 168 and 170. Like the previously described embodiment, a maximum clamping force is achieved once arm 214 reaches the position designated by full lines in FIG. 13.

Figure 15:
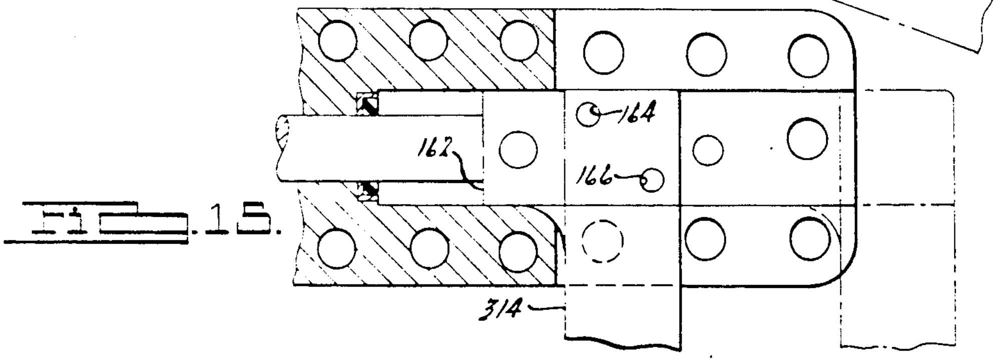
FIG. 15 is a partial longitudinal cross-sectional view taken in the center of the clamp shown in FIG. 14.

FIGS. 14 and 15 show yet another adaptation of the power clamp. This configuration provides for purely linear movement of arm 314. Arm 314 is simply rigidly pinned to slide block 162 by pins 107 through bores 164 and 166 and moves linearly within longitudinal slot 94. An additional arm 172, shown in FIG. 14, may be provided which is rigidly attached to housing 16 to act with arm 314 to clamp a workpiece.

Figure 17:
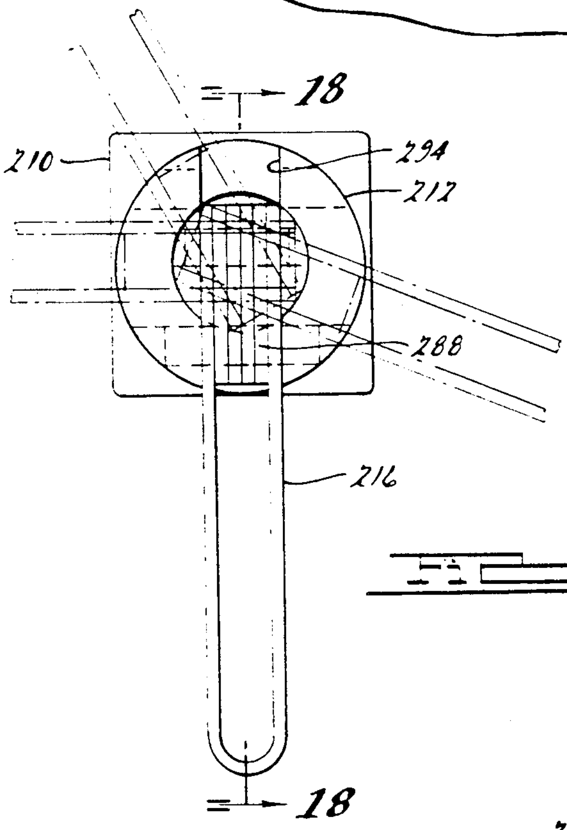
FIG. 17 is an end elevational view of the power clamp shown in FIG. 16.
Figure 19:
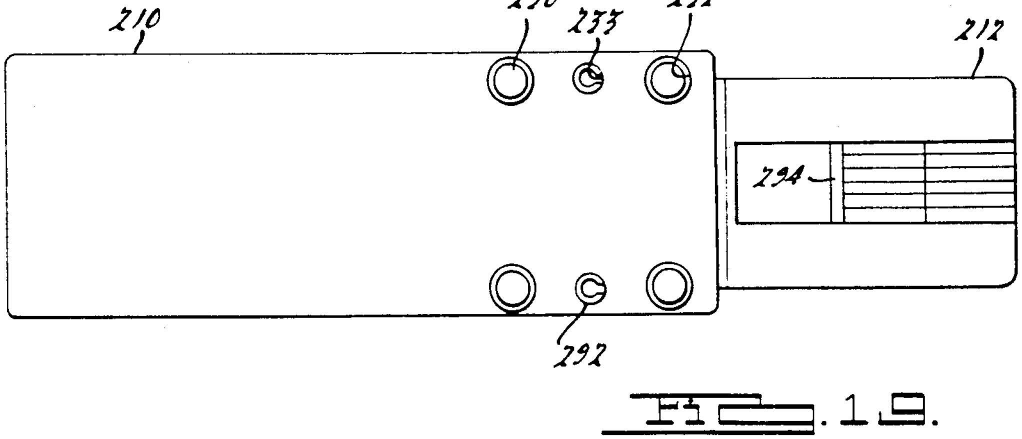
FIG. 19 is a top elevational view of the power clamp shown in FIG. 16.

FIGS. 16-20 illustrate a power clamp according to a second embodiment of this invention generally comprising body 210, clamping head 212, and arm 216. This embodiment, like the first embodiment described above, accommodates various arm configurations and further enables the clamping head 212 and arm 216 to be rotated about the longitudinal axis of body 210 as shown in FIG. 17 to the desired position and then fixed at that position for use. This added feature further enhances the adaptability of the power clamp for diverse applications.

Body 210 has an internal cylindrical bore 218 and an enclosed end 220. A pair of ports 226 and 228 are provided within end 220 for communicating fluid pressure to bore 218. Port 226 communicates with bore 218 at a point near the longitudinal center of body 210, whereas port 228 opens directly within end 220. Body 210 has a longitudinally extending slot 222 and defines pairs of laterally and longitudinally spaced bores 230 and 232, which enable body 210 to be fastened to a mounting structure 234. A pair of laterally separated bores 231 are also provided between bores 230 and 232.

Piston 236 is slidably disposed in bore 218 and has grooves 238 and 240 with seal assemblies 242 and 244 disposed therein. Piston 236 further defines central bore 246.

Figures 18, 20, 21:
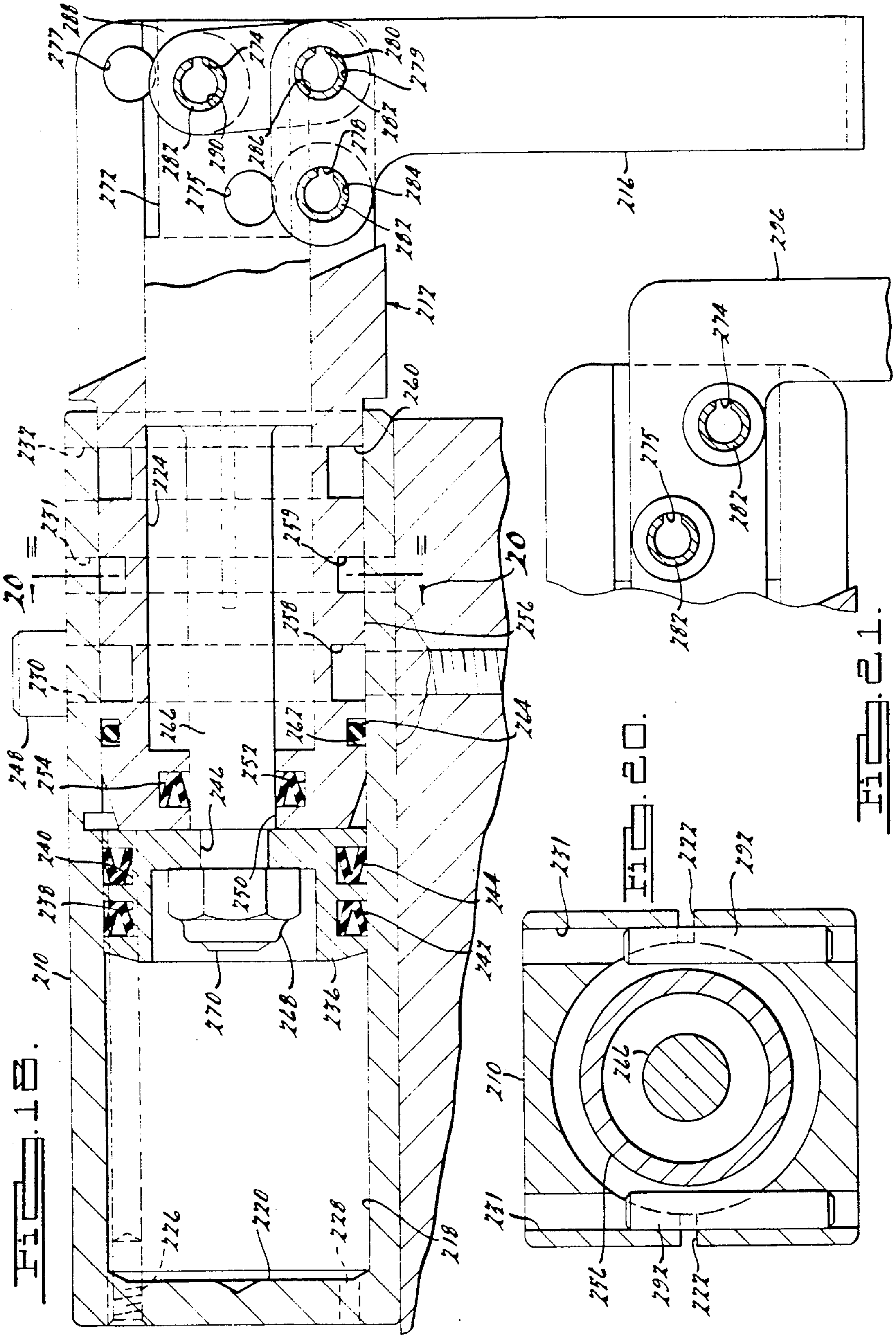
FIG. 18 is a longitudinal cross-sectional view taken along line 18—18 in FIG. 17.
FIG. 20 is a cross-sectional view taken along line 20—20 of FIG. 17.
FIG. 21 is a partial longitudinal cross-sectional view of a power clamp in accordance with the second embodiment of this invention showing a manner of attaching an arm which provides a linear clamping action.

Clamping head 212 is partially inserted within bore 218 and defines bore 224 and smaller bore 250. Groove 252 within bore 250 retains seal assembly 254. Actuating end 212 has an external stepped diameter. The smaller diameter internal section 256 is adapted for insertion within body 210 and defines grooves 258, 259, and 260. Grooves 258 and 260 provide clearance for mounting bolts 248 which retain clamping head 212 within bore 218. When body 210 is not fastened to a mounting structure, clamping head 212 is retained within bore 218 by roll pins 292 in bores 231. As best shown in FIG. 20, roll pins 292 fit in groove 259 and interlock with the side walls of the groove to prevent withdrawal of clamping head 212. Similar interlocking occurs when mounting bolts 248 are installed. Clamping head internal section 256 further defines groove 262 with seal assembly 264 disposed therein. Seal assemblies 264 and 254 seal the opened end of bore 218 so that fluid pressure supplied to ports 226 and 228 cause movement of piston 236. The larger diameter external section 276 of clamping head 212 defines a pair of longitudinally spaced bores 278, 279, laterally spaced hole 277, and longitudinal slot 294. As described below, the power clamp according to this second embodiment, like the first embodiment, accommodates a variety of actuated arms over various types and ranges of motion. However, since clamping head 212, according to the second embodiment, can be freely rotated, the clamping head need only have three bores 277, 278, and 279 to provide the above-mentioned adaptability.

Figure 22:
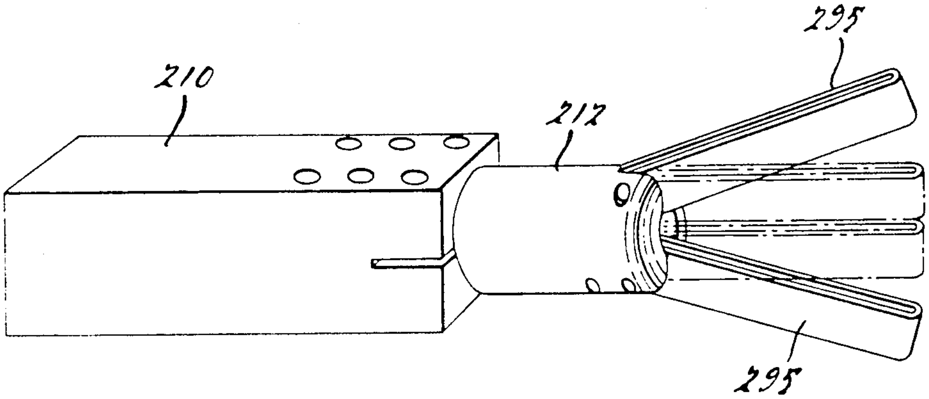
FIG. 22 is a pictorial view of a two-arm power clamp according to the second embodiment of this invention shown providing a double swinging arm clamping action.
Figure 23:
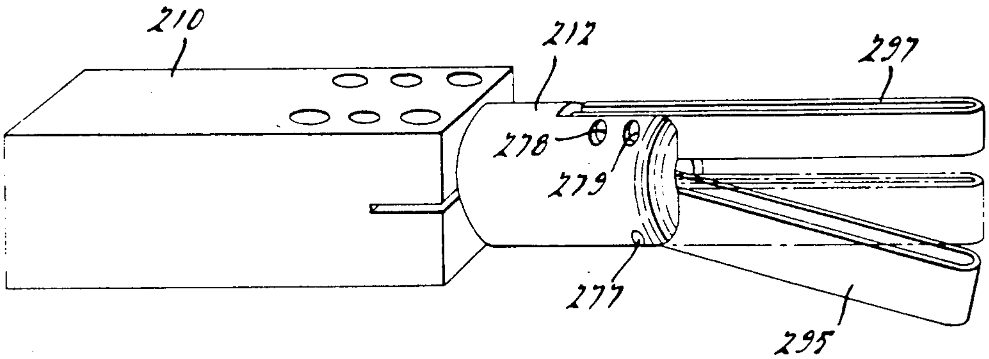
FIG. 23 is a pictorial view of a two-arm power clamp according to the second embodiment of this invention shown providing a single swinging arm clamping action.
Figure 24:
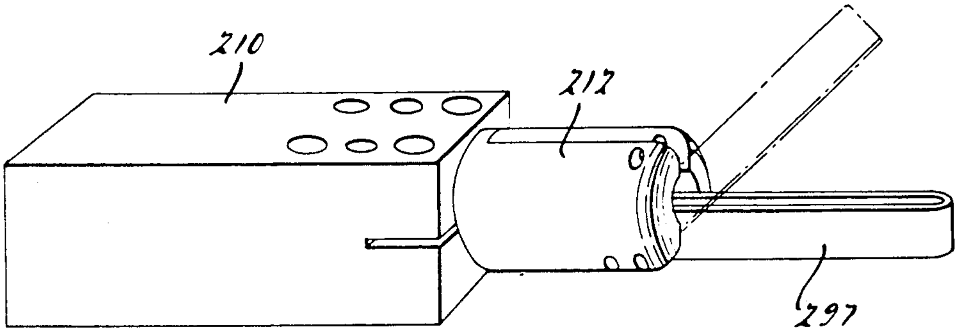
FIG. 24 is a pictorial view of a single-arm power clamp according to the second embodiment of this invention shown providing a single swinging arm horizontal clamping action.

Piston rod 266 is connected to piston 236 by rod nut 268 threaded onto threaded end 270. The opposite end of piston rod 266 defines slide block 272 having bores 274 and 275. Arm 216 includes bores 284 and 286 and is pinned for pivotable motion to clamping head 212 by roll pin 282 through bores 284 and 278. Link 288 having bores 280 and 290 is pivotably connected both to slide block 272 by roll pin 282 through bores 274 and 290, and to arm 216 by roll pin 282 through bores 286 and 280. When fluid pressure is conducted through ports 226 and 228, piston 236 slides in bore 218, causing arm 216 to move through a range of motion similar to that of the modification of the first embodiment shown in FIG. 6. The power clamp according to the second embodiment, like the first, enables a variety of arms to be actuated over various types of motion. FIG. 21 depicts a modification of the second embodiment similar to that shown in FIGS. 14 and 15 wherein arm 296 moves linearly since it is rigidly pinned to slide block 272 by pins 282 through bores 274 and 275. As shown in FIG. 22, the power clamp according to this embodiment can be used to provide a double arm clamping arrangement such as that shown in FIGS. 10 and 11 by attaching arms 295 by pins through bores 277 and 279. Similarly, referring to FIG. 23, a single arm clamp can be provided similar to that shown in FIGS. 12 and 13 by rigidly mounting one arm 297 by pins through bores 278 and 279 and providing another arm 295 like that shown in FIG. 22 pinned through bore 277. A horizontal clamp arrangement having arm 297 similar to that shown in FIGS. 8 and 9 is shown in FIG. 24.

This second embodiment of a power clamp enables clamping head 212 to be rotated with respect to body 210 to the desired angular orientation (see phantom positions in FIG. 17). When bolts 248 are loosely installed within bores 232, clamping head 212 can be freely rotated within body 210 due to the provision of slight radial clearance between clamping head internal section 256 and bore 218 and by the circumferential clearance for bolts 248 and roll pin 292 provided by grooves 230, 231, and 232. When it is desired to fix the rotational position of clamping head 212, bolts 248 fitting within groove 232 are tightened, which causes slight compression of body 210, facilitated by slot 222, which causes frictional engagement with clamping head internal section 256. Therefore, the angular position of clamping head 212 can be set in accordance with the requirements of a particular application and then set simply by tightening mounting screws 248.

Figures 25, 26:
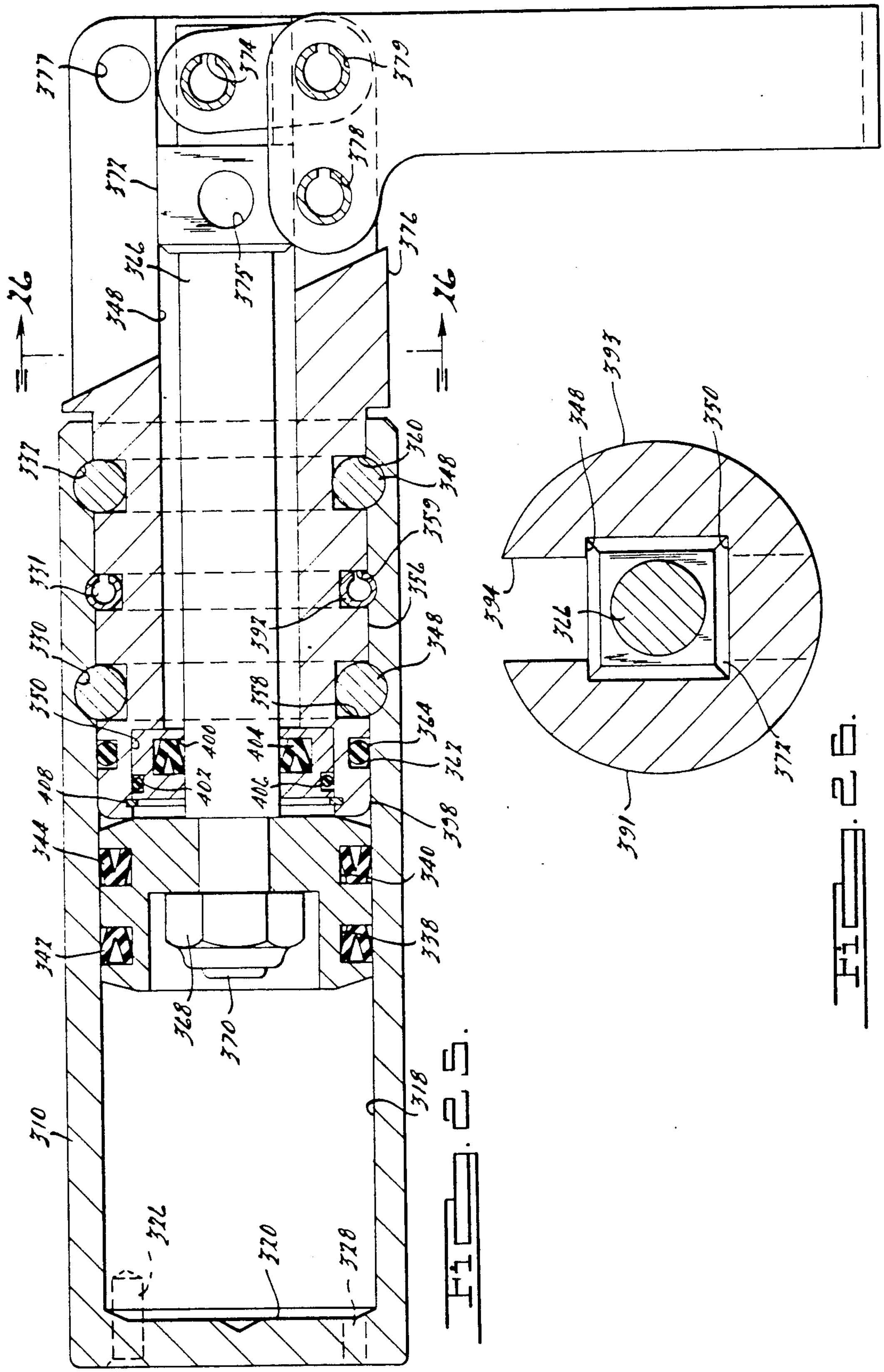
FIG. 25 is a longitudinal cross-sectional view taken in the center of a clamp in accordance with a third embodiment of this invention.
FIG. 26 is a cross-sectional view taken along line 26—26 of FIG. 25.

FIGS. 25 and 26 illustrate a third embodiment of a power clamp in accordance with this invention which is identical to the second embodiment in most respects with the exception of several design modifications. The power clamp shown in FIGS. 25 and 26 generally comprises body 310, clamping head 312, and arm 316.

Body 310 has an internal cylindrical bore 318 and an enclosed end 320 with ports 326 and 328. Body 310 further has a longitudinally extending slot 322 (not shown) and defines laterally and longitudinally spaced bores 330, 331, and 332. Piston 336 is slidably disposed in bore 318 and has grooves 338 and 340 with seal assemblies 342 and 344 disposed therein. Piston 336 further defines central bore 346.

Clamping head 312 is partially inserted within bore 318 and defines square bore 348 and larger cylindrical bore 350. Clamping head 312 has an external stepped diameter. The smaller diameter internal section 356 is adapted for insertion within body 310 and defines grooves 358, 359, and 360, and groove 362 for seal 364. Roll pins 392 and mounting bolts 348 are disposed in bores 330, 332, and 333 and function like the corresponding structures of the second embodiment. The larger diameter external section 376 of clamping head 312 defines a pair of longitudinally spaced bores 378, 379, laterally spaced bore 377, and longitudinal slot 394 defining two separated legs 391 and 393.

Piston rod 366 is connected to piston 336 by rod nut 368 threaded onto threaded end 370. The opposite end of piston rod 366 defines slide block 372 having bores 374 and 375. This third embodiment of a power clamp provides the same capability as the first and second embodiments for being adapted for various applications. This embodiment would employ arms and links identical to those described for the second embodiment and enables clamping head 312 to be rotated with respect to body 310.

The power clamp according to this third embodiment varies from that according to the second embodiment in several respects. Like the first embodiment, clamping head 312 defines internal square bore 348 and slide block 372 is provided having a corresponding external shape, as best shown in FIG. 26. Square bore 348 provides the advantage that during actuation, lateral loads exerted onto slide block 372 by the connecting arms or links are carried by wall surfaces 348 and 350 which are perpendicular to the applied lateral loads, rather than by curved surfaces (like the second embodiment) which can produce a wedging action which tends to separate legs 391 and 393 of the clamping head. This design feature of the first and third embodiments produces a clamp which more rigidly supports the various arms in their clamped positions. This embodiment further varies from the second in the inclusion of seal assembly 398 having grooves 400 and 402 with seals 404 and 406 disposed therein. Snap ring 408 retains seal element 398 in position. In all other respects, this third embodiment of a power clamp operates like that according to the second embodiment.

In all embodiments of the present invention the clamp should be installed so that full clamping takes place at or near the "center" position of the toggle linkage. Where power is no problem a slightly overcenter setting may be used, and in other applications a slightly undercenter setting may be used to insure that there will be sufficient force to unclamp (such as can be seen in FIG. 25).

While the above description constitutes the preferred embodiments of the present invention, it will be appreciated that the invention is susceptible to modification, variation and change without departing from the proper scope and fair meaning of the accompanying claims.

I claim:

1. A power clamp for actuating one or more clamping arms for clamping a workpiece, said power clamp comprising:

(a) a housing, said housing being formed in two portions, one being a fixed portion mounted to a supporting structure and the other being a swivel portion rotatable with regard to said fixed portion, said swivel portion comprising a clamping head extending from said fixed portion, said clamping head having an internal portion rotatably disposed in said fixed portion and an external portion defining a pair of spaced legs with free extending extreme ends having a slot therebetween;

(b) mounting means for mounting said housing to a support surface, said mounting means being integral with said fixed housing portion and including a plurality of housing mounting holes in said housing for receiving means for securing and mounting said housing to said support surface;

(c) a fluid motor disposed in said housing;

(d) clamp actuating means operable in said slot and being operatively connected to said motor;

(e) at least one clamping arm having a portion operatively connected to said clamp actuating means for clamping movement in said slot; and (f) arm positioning means comprising an arrangement of at least three arm mounting holes extending transversely through each of said legs of said clamping head, said three holes on each leg being aligned with said three holes on the other leg thereby defining hole pairs, each hole pair receiving means for attaching one or more of said clamping arms to said swivel portion, said arm mounting hole pairs being distinct from said housing mounting holes with two of said arm mounting hole pairs being positioned adjacent to said free extending ends of said legs on opposite sides of said slot with said third arm mounting hole pair positioned in transverse alignment with said two arm mounting hole pairs, each aligned hole pair defining a different mounting position of each said clamping arm on said clamping head to provide positioning of said arm in a variety of different positions for clamping in different positions;

each of said three hole pairs acting as a pivot point for an arm mounted therein, whereby the range and type of actuation of said clamping arm varies by selecting a mounting position from said variety provided by mounting positions of said arrangement of said arm mounting hole pairs.

2. A power clamp as claimed in claim 1, wherein said clamping arm is pivotally connected to said swivel portion by a pin, with the axis of said pin extending transversely with regard to the axis of rotation of said swivel portion.

3. A power clamp as claimed in claim 1, further comprising releasable locking means for preventing relative rotation between said fixed housing portion and said swivel portion.

4. A power clamp as claimed in claim 3, wherein said fixed housing portion is mounted to said supporting structure by a threaded fastener, and wherein tightening of said fastener actuates said locking means.

5. A power clamp as claimed in claim 1, wherein said clamping arm is pivotally secured to said housing by means of a pin passing through one mounting hole in said clamping arm and one mounting hole pair in said housing, said one mounting hole of said clamping arm being disposed in said slot.

6. A power clamp as claimed in claim 5, wherein said actuating means is pivotally connected to a second mounting hole in said arm.

7. A power clamp as claimed in claim 1, further comprising a central guideway bore in said swivel portion intersecting said slot, said actuating means being reciprocably disposed in said guideway bore.

8. A power clamp as claimed in claim 7, wherein said guideway bore is circular in cross-sectional configuration.

9. A power clamp for removable receipt of one or more workpiece-engaging arms and for actuation of at least one arm, said power clamp comprising:

(a) a housing having an internal bore;
(b) a piston longitudinally reciprocable in said bore;
(c) a piston rod attached to said piston;
(d) mounting means for mounting said housing to a support surface, said mounting means being integral with said housing and including a plurality of housing mounting holes in said housing for receiving means for securing and mounting said housing to said support surface;
(e) a clamping head comprising a pair of laterally spaced legs extending longitudinally from said housing to define a longitudinal slot sized to receive at least one of said arma therebetween, said legs having free extending extreme ends, and a plurality of arm mounting hole pairs, each said hole pair extending transversely through said legs and across said slot, said arm mounting hole pairs being distinct from said housing mounting holes with two of said arm mounting hole pairs being positioned adjacent to the said free extending ends of said legs on opposite sides of said slot with the third arm mounting hole pair being positioned below one of said two arm mounting hole pairs;
(f) pin means for mounting one or more of said arms in one or more of said arm mounting hole pairs respectively; and
(g) an actuating member connected to said piston rod and connectable to at least one of said arms, said actuating member having a mounting bore extending travsversely thereto, the relationship of said arm mounting hole pairs in said legs to said mounting bore in said actuating member providing means for selectively mounting each said arm in any one of a plurality of separate mounting positions relative to said legs for movement of each said arm relative to said legs in response to actuation by said piston, each of said three arm mounting hole pairs acting as a pivot point to an arm mounted therein so that the range and type of motion of actuation of each said arm is determined by its mounting position on said legs.

10. A power clamp as claimed in claim 9, wherein two of said plurality of said mounting hole pairs of said clamping head are parallel to one another and lie in a common longitudinal plane.

11. A power clamp as claimed in claim 10, wherein a third mounting bore of said clamping head is parallel to said first two mounting hole pairs but is spaced from said common plane.

12. A power clamp as claimed in claim 9, further comprising linkage means for operatively connecting one or more of said workpiece-engaging arms to said piston rod.

13. A power clamp as claimed in claim 12, further comprising a first arm pivotally supported by a pin disposed in one of said mounting hole pairs, and a second arm pivotally supported by a pin disposed in a second of said mounting hole pairs, said piston rod being pivotally connected to said first and second arms through said linkage means to pivot them towards and away from one another.

14. A power clamp for actuating one or more workpiece-engaging arms or various configurations, comprising:

(a) a housing having an internal bore;
(b) a piston longitudinally reciprocable in said bore;
(c) a piston rod attached to said piston;
(d) mounting means for mounting said housing to a support surface, said mounting means being integral with said housing and including a plurality of housing mounting holes in said housing for receiving means for securing and mounting said housing to said support surface;
(e) a pair of spaced legs connected to and extending longitudinally with respect to said housing, said legs having a longitudinal slot therebetween said legs having free extending extreme ends; and means defining at least three arm mounting hole pairs extending transversely through said legs and across said slot, said arm mounting hole pairs being distinct from said housing mounting holes in said housing with two of said arm mounting hole pairs being positioned adjacent to said free extending ends of said legs on opposite sides of said slot with the third mounting hole pair being positioned below one of said two arm mounting hole pairs, (i) said clamp in a first configuration having a single arm pivotally supported by a pin disposed in one of said arm mounting hole pairs with said piston rod pivotally connected thereto to pivot same;
(ii) said clamp in a second configuration having a first arm immovably secured by fasteners disposed in two of said arm mounting hole pairs, and a second arm pivotally supported by a pin disposed in a third of said arm mounting hole pairs with said piston rod pivotally connected thereto to pivot same,
(iii) said clamp in a third configuration having a first arm pivotally supported by a pin disposed in one of said arm mounting hole pairs, and a second arm pivotally supported by a pin disposed in a second of said arm mounting hole pairs, said piston rod being pivotally connected to said first and second arms to pivot them towards and away from one another.

* * * * *

UNITED STATES PATENT AND TRADEMARK OFFICE
CERTIFICATE OF CORRECTION

PATENT NO. : 5,118,088

DATED : June 2, 1992

INVENTOR(S) : Edwin G. Sawdon

It is certified that error appears in the above-identified patent and that said Letters Patent is hereby corrected as shown below:

Abstract, line 2, after "actuated" insert --either--.

Column 1, line 33, after "for" insert -- broad --.

Column 1, line 35, "then" should be -- them --.

Column 4, line 26, after "of" insert -- holes --.

Column 9, line 45, "arma" should be -- arms --.

Column 9, line 62, "travsversely" should be -- transversely --.

UNITED STATES PATENT AND TRADEMARK OFFICE

CERTIFICATE OF CORRECTION

PATENT NO. : 5,118,088 Page 2 of 2

DATED : June 2, 1992

INVENTOR(S) : Edwin G. Sawdon

It is certified that error appears in the above-indentified patent and that said Letters Patent is hereby corrected as shown below:

Column 10, line 26, "or" should be -- of --.

Signed and Sealed this

Fifth Day of October, 1993

Attest:

BRUCE LEHMAN

*Attesting Officer* *Commissioner of Patents and Trademarks*